3,383,628
TRANSMIT-RECEIVE HYBRID HAVING POLARIZATION FILTER
Gottfried Tschannen, Zurich, Switzerland, assignor to Albiswerk Zurich A.G., Zurich, Switzerland
Filed Nov. 3, 1964, Ser. No. 408,605
Claims priority, application Switzerland, Nov. 8, 1963, 13,767/63
10 Claims. (Cl. 333—11)

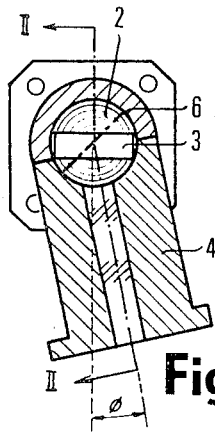
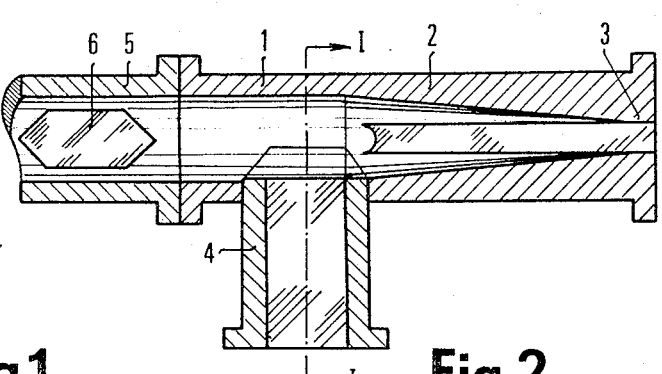
Fig.1  Fig.2
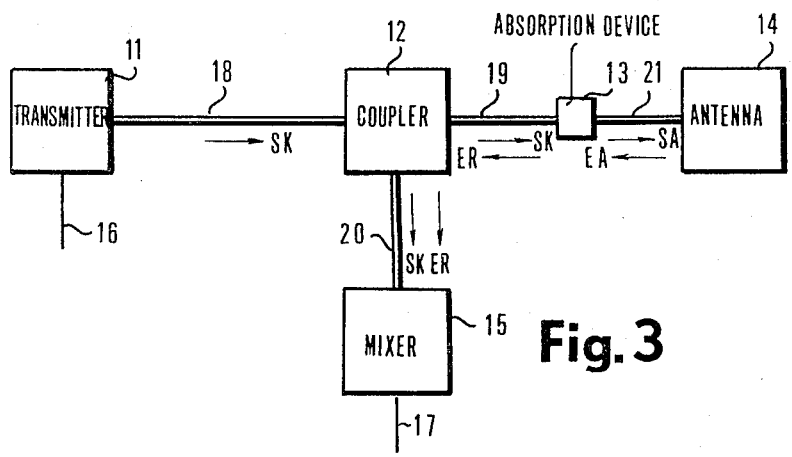
Fig.3
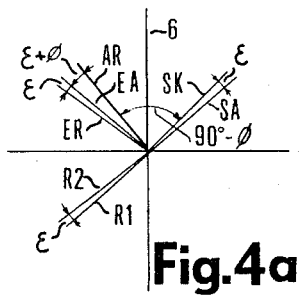
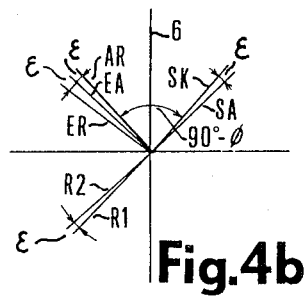
Fig.4a  Fig.4b
INVENTOR
GOTTFRIED TSCHANNEN
BY: McGlew and Toren
ATTORNEYS United States Patent Office 3,383,628
Patented May 14, 1968

ABSTRACT OF THE DISCLOSURE

A transmit-receive polarization filter, for use in transmitting and receiving energy in which the transmitted energy and the received energy have mutually perpendicular polarization planes, and including wave guide means coupling all of the received energy and a part of the transmitted energy to a receiver along a coupling direction, is disclosed as including means for preventing interference in the receiver by transmitted energy reflected from the antenna. The means comprises a wave absorption device effective to angularly displace the polarization planes of the transmitted and received energy, in the form of microwaves, reltive to the coupling direction and by an amount such that the polarization plane of the reflected energy is substantially perpendicular to the coupling direction.

*Background of the invention*

This invention relates to the transmission and reception of microwaves and, more particularly, to a novel method of and apparatus for preventing interference, in the receiver, by transmitted microwave energy reflected from an antenna.

The present invention is particularly directed to a microwave transmit-receive polarization filter, such as described in U.S. Patene No. 3,217,273, wherein the polarization plane of the received waves is perpendicular to that of the transmitted waves, and wherein the entire received energy is fed through a coupler to the receiver.

Arrangements of this type are used in all range finders utilizing continuous waves. A respective transmitter and a respective receiver are placed at each end of the distance to be measured, and the distance itself is determined from the phase displacement of the received modulation waves relative to the transmitted modulation waves, with the phase displacement being dependent upon the distance measured. The coupler must be so designed that all of the received energy is conducted to the receiver. For the determination of the phase displacement or the phase angle, a part of the transmitted energy must also be fed to the receiver.

Every antenna arrangement or array has points at which a part of the transmitted energy is reflected. A part of this reflected energy is fed to the receiver, and it can be readily seen that this will lead to erroneous measurements of the distance.

An object of the present invention is to provide a method for preventing transmission of such reflected energy to the receiver.

Another object of the invention is to provide an apparatus for preventing transmission of such reflected energy to the receiver.

A further object of the invention is to preovide a microwave transmitting and receiving arrangement of the type described in which an absorption device, for angularly displacing the directions of polarization, is then placed between the coupler and the antenna.

Still a further object of the invention is to provide a microwave transmitting and receiving arrangement of the described type and in which an absorption device is placed between the coupler and the antenna to rotate the direction of polarization and is so dimensioned that the polarization plane of the waves reflected in the antenna is perpendicular to that of the components coupled by the coupler (coupling direction).

For an understanding of the present invention, reference is made to the following description of a typical embodiment thereof as illustrated in the accompanying drawings.

In the drawings:

FIG. 1 is a sectional view, taken on the line I—I of FIG. 2, of a transmit-receive polarization filter suitable for use in practicing the method of the invention;

FIG. 2 is a sectional view, taken on the line II—II of FIG. 1, of the transmit-receive polarization filter;

FIG. 3 is a schematic diagram of a microwave line embodying the invention; and

FIG. 4 graphically illustrates two possible relations of the polarization planes to each other, in accordance with the invention.

FIGS. 1 and 2 illustrate an exemplary transmit-receive polarization filter which may be used with the method and apparatus of the invention. This transmit-receive polarization filter comprises a circular cross section hollow wave guide 1, a reducer 2 serving as a transformation member, a first rectangular cross section hollow wave guide 3, and a second rectangular cross section hollow wave guide 4. Wave guide 4 is positioned adjacent the larger cross section end of reducer 2. The polarization planes of the waves propagated in the rectangular cross section wave guides 3 and 4 are perpendicular to each other.

At the end of wave guide 1, there is secured another circular cross section hollow wave guide 5. A resistance card 6 is inserted into wave guide 5 to act as a wave absorption device. In FIG. 1, the card 6 is shown in broken lines because it is not directly visible in this figure.

The angular relation of the second rectangular cross section wave guide 4, with respect to the first rectangular cross section wave guide 3, is illustrated in FIG. 1. The angle $\phi$ formed by the illustrated principal axes of the rectangular cross section wave guides 3 and 4 is so selected that substantially the entire received energy, from the wave guide 1, and a small portion of the transmitted energy, from the wave guide 3, is directed into the secondary wave guide 4. The energies in the wave guide 4, as a function of the angle $\phi$, are as follows:

The part of the transmitting energy:

$$E'_S = E_S \sin^2 \phi$$

The part of the received energy:

$$E'_E = E_E \cos^2 \phi$$

In the above $E_S$=transmitting energy
$E_E$=received energy
$E'_S$=the part of the transmitting energy in guide 4
$E'_E$=the part of the received energy in guide 4.

The arrangement of wave guides 1 and 4 work as a coupler.

FIG. 3 schematically illustrates a microwave transmission and receiving arrangement embodying the invention. A modulation voltage is supplied through the line 16 to a transmitter 11. A wave guide 18 connects transmitter 11 to a coupler 12. Coupler 12 has two wave guides 19 and 20 extending therefrom. The wave guides 18, 19 and 20 correspond to the wave guides 3, 1 and 4, respectively, of FIGS. 1 and 2. Wave guide 20 connects coupler 12 to a mixer stage 15. A line 17 connects the mixer stage 15 to an intermediate frequency amplifier of the receiver, which latter has not been illustrated. Wave guide 19 connects coupler 12 to a wave absorption device 13 connected by a wave guide 21 to an antenna 14.

Resistance card 6, which is used as absorption device 13, is so dimensioned and positioned that it angularly displaces or rotates the polarization planes by a relatively small angle $\epsilon$. Angle $\epsilon$ has a value which is so related to the angle $\phi$ of coupler 12 that the polarization plane of the reflections of the transmitted microwaves from the antenna is perpendicular to that of the waves coupled by coupler 12. The turning of the polarization directions of the transmitted waves, due to the insertion of the resistance card 6, is effected as will now be described. Each electromagnetic wave which is fed to circular cross section wave guide 5 can be considered as consisting of two components, the polarization directions of whose electric fields are perpendicular to each other. The resistance card 6, which is inserted parallel to the electric field of one of the assumed components, causes a reduction of the latter. The polarization of the resulting total field of the transmitted wave therefore appears turned by the angle $\epsilon$ compared to the original polarization direction.

The polarization plane SK of the waves transmitted from cavity resonator 11 has an angle of 45° with respect to the perpendicular coordinate axes of FIG. 4a. The angle $\phi$ of the coupler is assumed to be 7.5°. The resistance card 6 serving as the wave absorption device 13 is aligned with the ordinate axis of FIG. 4a. Resistance card 6 rotates or angularly displaces the polarization plane SK clockwise through the angle $\epsilon$, so that the transmitted wave oscillates in the polarization plane SA.

In the wave guide 21, the polarization plane R1 of the reflections formed in antenna 14 extends parallel to the polarization plane SA. The received wave oscillates in the polarization plane EA which, relative to the ordinate axis of FIG. 4a, is symmetrical with the polarization plane SA.

The resistance card in wave absorption device 13 turns the polarization plane EA of the received wave counterclockwise, and the polarization plane R1 of the reflections clockwise, both displacements being equal to the angle $\epsilon$. The received wave thus oscillates in the polarization plane ER, and the reflected wave oscillates in the polarization plane R2. In the illustrated position of the decoupler AR, the portion $E_E \cos^2(\phi+2\epsilon)$ of the received wave, and the portion $E_S \sin^2 \phi$ of the transmitted energy are coupled from the wave guide 1.

The angle $\phi$ of the coupler has been assumed to be 7.5°. The polarization plane R1 of the reflected energy must therefore be turned by 7.5°. Since the polarization plane SK is turned clockwise, by wave absorption device 13, through the angle $\epsilon$, and the polarization plane R1 is turned clockwise by the same angle $\epsilon$, $2\epsilon$ must equal $\phi$ and thus $\epsilon=3.75°$.

The received energy $E_{E'}=E_E \cdot \cos^2(15°)$, delivered to mixer stage 15, can be increased to $E_{E'}=E_E \cos^2(7.5°)$ by rotation of polarization plane SK in the transmitter and by a corresponding rotation of coupler 12, while maintaining both angles $\phi$ and $\epsilon$ at their respective values.

FIG. 4b shows the directions of the polarization planes for this case. The angle between polarization plane SK and the abscissa axis is equal to $45°+\epsilon$, or 48.75°. This angle is reduced to 45° by the rotation effected by wave absorption device 13, so that the polarization plane SA of the wave radiated by antenna 14 forms, in the opposite receiver, a polarization plane EA with an angle of 45°. This polarization plane EA is rotated, in wave absorption device 13, by −3.75° so that the polarization plane ER now forms an angle of 41.25° with the abscissa axis.

The polarization plane R1 of the energy reflected from the antenna, due to reflected transmitted microwaves, also forms an angle of 45° with the abscissa axis. This latter polarization plane is further rotated by the wave absorption device 13 through −3.75°, so that the polarization plane R2 now forms an angle of 41.25° with the abscissa axis. The relative angular orientation ($\phi$) of the coupler 20, which is the wave guide 4 of FIGS. 1 and 2, must now be such that the polarization plane R2 is perpendicular to the coupling direction AR. Therefore, the coupling direction AR must form an angle of 48.75° with the abscissa axis. The angle between the polarization plane ER and the coupling direction AR is thus 7.5°. Consequently, the energy conducted to the mixer stage 15 comprises the part of the transmitted energy $E'_S=E_S \cdot \sin^2(7.5°)$ and the part of the received energy $E_{E'}=E_E \cdot \cos^2(7.5°)$.

While a specific embodiment of the invention has been shown and described in detail to illustrate the application of the principles of the invention, it will be understood that the invention may be embodied otherwise without departing from such principles.

What is claimed is:

1. In the transmission and reception of microwaves in which the polarization plane of the received waves is perpendicular to that of the transmitted waves, and wherein all of the received energy and a part of the transmitted energy are coupled to a receiver, and wherein transmitted energy reflected from an antenna is coupled to the receiver and causes interference, the improvement comprising angularly displacing the polarization planes of the transmitted and received microwaves, relative to the coupling direction, by an amount such that the polarization plane of the reflected energy is substantially perpendicular to the coupling direction.

2. The improvement claimed in claim 1, in which such angular displacing of the polarization planes of the transmitted and received microwaves is effected between the antenna and the receiver.

3. The improvement claimed in claim 2, including increasing the value of the received energy by conjointly rotating the polarization plane of the transmitted microwaves and the coupling direction of the coupler while maintaining constant such displacement angle and the angle between the coupling direction and the polarization plane of the transmitted microwaves.

4. In a transmit-receive polarization filter, for use in transmitting and receiving energy in which the transmitted energy and the received energy have mutually perpendicular polarization planes, and including wave guide means coupling all of the received energy and a part of the transmitted energy to a receiver along a coupling direction, means for preventing interference in the receiver by transmitted energy reflected from the antenna, said means comprising means angularly displacing the polarization planes of the transmitted and received microwaves by an amount such that the polarization plane of the reflected energy is substantially perpendicular to the coupling direction.

5. In a transmit-receive polarization filter, as claimed in claim 4, said means angularly displacing the polarization planes of the transmitted and received energy relative to said coupling direction.

6. In a transmit-receive polarization filter, as claimed in claim 4, said means being interposed between the antenna and the receiver.

7. In a transmit-receive polarization filter, as claimed in claim 6, said means angularly displacing the polarization planes of the transmitted and received microwaves relative to said coupling direction.

8. In a transmit-receive polarization filter, as claimed in claim 4, said means comprising a wave absorption device positioned between the antenna and the receiver and displacing the polarization planes of the transmitted and received microwaves relative to said coupling direction.

9. In a transmit-receive polarization filter, as claimed in claim 4, a transmitter; means coupling a modulating voltage to said transmitter; a first wave guide means connecting said transmitter to the input of said filter; a second wave guide means coupling said filter to said receiver; an antenna; and a third wave guide means connecting said filter to said antenna; said means angularly displacing the polarization planes of the transmitted and received energy comprising a wave absorption device positioned in said third wave guide means.

10. Microwave transmitting and receiving apparatus, as claimed in claim 9, in which said wave absorption device includes a resistance card.

References Cited
UNITED STATES PATENTS

| | | | |
|---|---|---|---|
| 2,735,092 | 2/1956 | Brown | 325—24 X |
| 2,748,353 | 5/1956 | Hogan | 434—100 |
| 2,850,624 | 9/1958 | Kales | 333—21 X |
| 3,217,273 | 11/1965 | Isch et al. | 333—21 X |
| 3,307,183 | 2/1967 | Adam | 343—16 |

HERMAN KARL SAALBACH, *Primary Examiner.*

M. L. NUSSBAUM, *Assistant Examiner.*